(12) United States Patent
Miwa et al.

(10) Patent No.: US 7,597,343 B2
(45) Date of Patent: Oct. 6, 2009

(54) AIRBAG APPARATUS

(75) Inventors: Kazuya Miwa, Tokyo (JP); Wataru Nakazawa, Tokyo (JP); Akira Kokeguchi, Tokyo (JP)

(73) Assignee: Takata Corporation, Tokyo (JP)

( * ) Notice: Subject to any disclaimer, the term of this patent is extended or adjusted under 35 U.S.C. 154(b) by 227 days.

(21) Appl. No.: 11/635,567

(22) Filed: Dec. 8, 2006

(65) Prior Publication Data

US 2007/0138769 A1 Jun. 21, 2007

(30) Foreign Application Priority Data

Dec. 21, 2005 (JP) .............................. 2005-368742

(51) Int. Cl.
*B60R 21/20* (2006.01)
(52) U.S. Cl. ................. 280/728.2; 280/743.1
(58) Field of Classification Search ............. 280/728.2, 280/728.3, 743.1, 743.2
See application file for complete search history.

(56) References Cited

U.S. PATENT DOCUMENTS

| | | | | |
|---|---|---|---|---|
| 5,013,064 A | * | 5/1991 | Miller et al. .............. | 280/730.1 |
| 5,452,913 A | * | 9/1995 | Hansen et al. ............ | 280/728.1 |
| 5,498,030 A | * | 3/1996 | Hill et al. ................. | 280/743.1 |
| 5,533,750 A | * | 7/1996 | Karlow et al. ............ | 280/730.2 |
| 5,560,644 A | * | 10/1996 | Fiore ....................... | 280/728.2 |
| 5,613,698 A | * | 3/1997 | Patercsak et al. ......... | 280/728.1 |
| 5,755,459 A | | 5/1998 | LaLonde | |
| 5,765,863 A | | 6/1998 | Storey et al. | |
| 5,765,867 A | * | 6/1998 | French ..................... | 280/743.2 |
| 5,772,239 A | * | 6/1998 | Seymour .................. | 280/728.3 |
| 6,045,151 A | * | 4/2000 | Wu .......................... | 280/728.3 |
| 6,070,904 A | * | 6/2000 | Ozaki et al. ............... | 280/743.1 |
| 6,129,377 A | * | 10/2000 | Okumura et al. ......... | 280/730.2 |
| 6,145,879 A | * | 11/2000 | Lowe et al. ............... | 280/743.1 |
| 6,220,624 B1 | * | 4/2001 | Abraham et al. .......... | 280/728.2 |
| 6,364,349 B1 | * | 4/2002 | Kutchey et al. ........... | 280/730.2 |
| 6,371,510 B1 | | 4/2002 | Marriott et al. | |
| 6,412,810 B1 | * | 7/2002 | Wipasuramonton et al. ...... | 280/730.2 |
| 6,579,584 B1 | * | 6/2003 | Compton .................... | 428/35.7 |
| 6,585,292 B2 | * | 7/2003 | Abe et al. ................. | 280/743.1 |
| 6,722,693 B2 | * | 4/2004 | Ikeda et al. ............... | 280/730.2 |
| 6,802,526 B2 | * | 10/2004 | Dumbrique et al. ...... | 280/728.2 |
| 6,808,199 B2 | * | 10/2004 | Saderholm et al. ........ | 280/730.2 |
| 6,874,810 B2 | * | 4/2005 | Soderquist ............... | 280/728.3 |

(Continued)

FOREIGN PATENT DOCUMENTS

DE 202 15 165 U1 2/2003

(Continued)

*Primary Examiner*—Paul N Dickson
*Assistant Examiner*—Laura Freedman
(74) *Attorney, Agent, or Firm*—Manabu Kanesaka (57) ABSTRACT

An airbag apparatus includes an airbag, an airbag housing portion for housing the airbag in a folded-back condition, an airbag cover for covering the airbag opening, a gas-supplying portion for supplying gas to the airbag, an airbag-holding member formed of a film sheet, and a thin thickness portion formed in the film sheet of the airbag-holding member. The airbag-holding member holds a folded-back shape of the airbag while wrapping around an external surface of the airbag in the folded-back condition. The airbag-holding member is ruptured at the thin thickness portion by the gas supplied from the gas supplying portion when a motor vehicle accident occurs.

11 Claims, 6 Drawing Sheets

U.S. PATENT DOCUMENTS

| | | | |
|---|---|---|---|
| 6,913,280 B2 * | 7/2005 | Dominissini et al. | 280/728.2 |
| 6,948,736 B2 * | 9/2005 | DePottey et al. | 280/728.2 |
| 7,125,043 B2 * | 10/2006 | Amamori | 280/743.1 |
| 7,314,228 B2 * | 1/2008 | Ishiguro et al. | 280/728.2 |
| 7,549,271 B2 * | 6/2009 | Miwa et al. | 53/436 |
| 2002/0089155 A1 | 7/2002 | Tajima et al. | |
| 2003/0122356 A1 * | 7/2003 | Fischer et al. | 280/743.1 |
| 2004/0155438 A1 * | 8/2004 | Hawthorn et al. | 280/728.2 |
| 2007/0138768 A1 * | 6/2007 | Miwa et al. | 280/728.2 |
| 2007/0145724 A1 * | 6/2007 | Miwa et al. | 280/728.1 |
| 2007/0241541 A1 * | 10/2007 | Miwa et al. | 280/728.2 |

FOREIGN PATENT DOCUMENTS

| | | |
|---|---|---|
| EP | 1 464 551 A1 | 10/2004 |
| JP | H11-28997 | 2/1999 |

* cited by examiner

AIRBAG APPARATUS

BACKGROUND OF THE INVENTION AND RELATED ART STATEMENT

The present invention relates to an airbag apparatus for use in a motor vehicle mounted on the motor vehicle.

Hitherto, an airbag apparatus, in which an airbag is developed and expanded in an occupant restraining area at a time when a motor vehicle accident is caused, is known. Further, in Japanese Patent Publication (KOKAI) No. 11-28997, in this kind of airbag apparatus, a folded-back shape of the airbag is held by an airbag-holding member constructed by a cloth covering the previously folded back airbag. However, in designing an airbag apparatus using such an airbag-holding member, there is a demand for structuring an airbag-holding member in considering a developing capability of the airbag at a time of a motor vehicle accident, in addition to a holding capability for assuredly holding a folded-back shape of the airbag in a condition in which the airbag is housed in a housing portion.

Consequently, the present invention is made in consideration of the above-described point of view, and it is an object of the invention to provide a technology effective for achieving a capability of development of the airbag, as well as assuredly holding a folded-back shape of the airbag that is previously folded back, in the airbag apparatus for use in a motor vehicle mounted on the motor vehicle.

Further objects and advantages of the invention will be apparent from the following description of the invention.

SUMMARY OF THE INVENTION

The present invention is constructed in order to solve the aforementioned problems. Incidentally, the present invention can be applied to an airbag apparatus mounted on various types of motor vehicles, such as, regular automobile, trucks, buses, electric trains, boats and ships, motor cycles, and so forth.

(First Invention)

A first invention of the present invention for solving the aforementioned problems is an airbag apparatus according to a first aspect. The airbag apparatus according to the first aspect at least includes an airbag, an airbag housing portion, an airbag cover, a gas-supplying portion, an airbag-holding member and a thin thickness portion.

The airbag in the present invention is constructed as an airbag being expanded while developed in a predetermined developing and expanding area at a time of a motor vehicle accident, and restraining bodies inside and outside a motor vehicle. An object to be restrained by the airbag includes an occupant seated in a driver's seat, an occupant seated in a passenger seat, an occupant seated in a seat other than the driver's seat or the passenger seat, such as a rear seat, a pedestrian outside a motor vehicle, or the like. Accordingly, in a developing and expanding area where the airbag according to the present invention is developed and expanded, not only an in-car area where an occupant as the restraining object exists, but also an area outside the motor vehicle where the pedestrian as the restraining object exists, are widely included.

The airbag housing portion according to the present invention is constructed to house the airbag in a folded-back condition folded back in a predetermined configuration, and to include an airbag opening that allows the airbag to be developed and expanded. As the "predetermined configuration" described here, there are a roll-folding configuration formed in a manner such that the airbag is retracted into a roll shape, a bellows folding configuration formed in a manner such that the airbag is folded back into a bellows shape, a folding configuration in which these configurations are combined, and the like. The airbag housed in the airbag housing portion protrudes outside the airbag housing portion through the airbag opening at a time when the airbag is developed and expanded. The airbag opening is covered by means of the airbag cover according to the present invention.

The gas-supplying portion according to the present invention has a function for supplying the gas for airbag expansion so as to develop and expand the airbag to a developing and expanding area, when the motor vehicle accident occurs. In concrete terms, the gas-supplying portion has a construction for generating the gas for airbag expansion by detecting an occurrence of the motor vehicle accident, and for introducing the gas for airbag expansion into an inside of the airbag.

The airbag-holding member according to the present invention is constructed such that a film sheet, in which a plurality of resin layers is configured to have a layer-stack shape with regard to a sheet cross-sectional direction, is formed into a bag shape that wraps around an entire external surface of the airbag in a folded-back condition. Further, the airbag-holding member has a function for holding the folded-back shape of the airbag while covering the external surface of the airbag in the folded-back condition, which is housed in the airbag housing portion, in a partitioned area partitioned by the airbag housing portion and an airbag cover. Accordingly, the airbag in the folded-back condition is to be packaged in a tightly sealed manner by means of the film sheet.

As the film sheet, a film sheet having translucency, a film sheet having no translucency, or the like can appropriately be used. In the present invention, with regard to a construction for forming the film sheet into the bag shape that wraps around the entire external surface of the airbag in the folded-back condition, there may be a construction in which each of outer edge portions, facing each other, of each of film sheet pieces is joined by means of heat-welding, bonding, or the like, and tightly sealed, upon sandwiching the airbag in the folded-back condition by means of one or a plurality of film sheet pieces, a construction in which an airbag in a folded-back condition is put into an opening bag-shaped, or a tube-shaped (cylindrical) film sheet member that is previously prepared, through the opening thereof, and thereafter the opening portion is bound up and tightly sealed by means of a clamp, or the like.

Further, in the present invention, with regard to a construction to form a plurality of resin layers in a layer-stack manner with regard to a sheet cross-sectional direction, a single film sheet having an integrally formed shape including a plurality of resin layers may be used, or a construction in which a plurality of film sheets formed from each resin layer is overlapped on each other in a layer-stack manner may be used.

The thin thickness portion according to the present invention is constructed as a portion in which a thickness in a sheet cross-sectional direction is formed to be thinner at a predetermined portion, which is previously set, than that of the other sheet portion, in each of the portions of the film sheet of the airbag-holding member. Typically, the thin thickness portion has a construction of a line shape formed in a continuous or intermittent manner along a sheet plane surface of the film sheet. The thin thickness portion is called as a tear line (line-like groove) or a weak portion. The airbag-holding member provided with the thin thickness portion having such a construction is ruptured at the thin thickness portion by receiving developing and expanding force of the airbag that is developed and expanded by means of the gas for airbag expansion, which is supplied from the gas-supplying portion, at a time of occurrence of a motor vehicle accident, and is formed to have a construction for allowing developing and expanding operations of the airbag, while releasing a holding condition of the folded-back shape of the airbag.

In accordance with such a construction of the airbag apparatus according to the first aspect, by using an airbag-holding member composed of a film sheet formed into a bag shape that wraps around an entire external surface of the airbag in the folded-back condition, the folded-back shape of the airbag in the folded-back condition is prevented from being deformed, and it becomes possible to assuredly hold the folded-back shape. By thus constructing, it becomes possible for a quality with regard to stably holding the folded-back shape of the airbag. Further, in the present invention, since the film sheet wraps around the entire external surface of the airbag, there is no possibility that the folded-back configuration of the airbag is limited by being influenced by a structure of the airbag-holding member side. Furthermore, by means tightly sealing the airbag in the folded-back condition by means of the bag-shaped film sheet, it becomes possible to suppress a deterioration of the airbag.

Moreover, in the present invention, since the thin thickness portion is provided at a previously determined position of the airbag-holding member, and the airbag-holding member is constructed to be ruptured at the thin thickness portion, it becomes possible to suppress the airbag-holding member to affect bad influence to the developing capability of the airbag by being ruptured at an unspecified portion, and thereby it becomes possible to achieve the appropriate developing capability of the airbag.

Further, according to the present invention, various functions are applied to a plurality of resin layers of the film sheet. For example, it becomes possible to configure a first resin layer to be a resin layer having translucency (hereinafter sometimes called as translucent resin layer) and high strength, and a second resin layer to be a resin layer having translucency and an environmental deterioration resistance, in the plurality of resin layers of the film sheet. In accordance with such a construction, it becomes possible to apply a further function to the film sheet constituting the airbag-holding member, and it is rational.

(Second Invention)

The second invention of the present invention for solving the aforementioned problems is the airbag apparatus according to a second aspect. In the airbag apparatus according to the second aspect, the airbag-holding member according to the first aspect is constructed such that the force required when being ruptured at the thin thickness portion is configured to be smaller than the force for holding the folded-back shape of the airbag in the folded-back condition.

In accordance with such a construction of the airbag apparatus according to the second aspect, when the gas for airbag expansion is supplied from the gas-supplying portion to the airbag at a time of occurrence of the motor vehicle accident, the folded-back shape of the airbag in the folded-back condition can be assuredly held during the time between the start of supplying the gas to the rupture of the airbag holding member at the thin thickness portion.

(Third Invention)

The third invention of the present invention for solving the aforementioned problems is the airbag apparatus according to a third aspect. In the airbag apparatus according to the third aspect, the airbag-holding member according to either one of the first or second aspect is constructed such that the thin thickness portion is positioned at an airbag opening side of the airbag-holding member, when the airbag in the folded-back condition is housed in the airbag housing portion.

In accordance with such a construction of the airbag apparatus according to the third aspect, since the airbag-holding member is ruptured at a proximity position close to the airbag opening, and the airbag is to be protruded outside of the airbag housing portion through the airbag opening from the proximity position, it becomes possible to suppress an operation of the airbag to be limited. Therefore, the developing capability of the airbag is smooth.

(Fourth Invention)

The fourth invention of the present invention for solving the aforementioned problems is the airbag apparatus according to a forth aspect. In the airbag apparatus according to the forth aspect, the airbag-holding member according to the third aspect is constructed such that the thin thickness portion that is positioned at the airbag opening side of the airbag-holding member is colored with a predetermined color. With regard to the "coloring for the thin thickness portion" described here, the coloring operation for the thin thickness portion may be performed by painting the thin thickness portion itself or by coloring the thin thickness portion by a colored tape or a sticker to adhere to the thin thickness portion. Typically, it is preferable to use a warm color or a highly visible color so that the position, the direction (extending direction), or the like, of the thin thickness portion is easily recognized by a worker.

In accordance with such a construction of the airbag apparatus according to the forth aspect, in an assembling work for housing the airbag-holding member that is holding the airbag in the folded-back condition into the airbag housing portion, the worker can easily recognize the position or the like of the thin thickness portion and occurrence of an erroneous assembling work becomes possible to be prevented.

(Fifth Invention)

The fifth invention of the present invention for solving the aforementioned problems is the airbag apparatus according to a fifth aspect. In the airbag apparatus according to the fifth aspect, the airbag-holding member according to any one of the first to fourth aspects has a construction using a film sheet including at least one of resin layers in the resin layer having the translucency, the resin layer having the high strength, and a resin layer having the environmental deterioration resistance, as a film sheet. The resin layer having the translucency is defined as a resin layer having a function that enables folded-back condition of the airbag to be visibly confirmed. As for the film sheet having the translucency, it is sufficient that the translucent film sheet enables visible confirmation through the film sheet regardless of the small or large of a degree of the translucency.

As the resin layer, a transparent resin layer and a half transparent resin layer (translucent white resin layer or colored resin layer) can appropriately be used. The resin layer having the high strength is defined as a resin layer having a strength capable of holding the folded-back shape of the airbag against the force of the airbag in a condition once folded back to release the folded-back condition. The resin layer having the environmental deterioration resistance is defined as a resin layer that is good at anti-weatherability such as, heat resistance, moisture resistance, light stability, and so forth.

In accordance with such a construction of the airbag apparatus according to the fifth aspect, it becomes possible to provide an airbag apparatus in which the folded-back shape of the airbag is assuredly held and further, to provide an airbag apparatus in consideration of the visibility of the airbag in the folded-back condition, and the strength of the airbag holding member, or the environmental deterioration resistance.

(Sixth Invention)

The sixth invention of the present invention for solving the aforementioned problems is the airbag apparatus according to a sixth aspect. In the airbag apparatus according to the sixth aspect, the airbag-holding member according to any one of the first to fifth aspects is constructed such that the airbag has a reduced volume by compressing the airbag in the folded-back condition via the bag-shaped film sheet from outside of the airbag. With regard to compressing the airbag in the folded-back condition, it is enabled by reducing the volume of the airbag by vacuuming for an internal part of the film sheet in a condition of housing the airbag in the film sheet formed into a bag shape, or by pressurizing the film sheet itself from outside.

In accordance with such a construction of the airbag apparatus according to the sixth aspect, the size occupied by the airbag in the folded-back condition, which is held by means of the airbag-holding member can be suppressed and an entire airbag apparatus becomes compact.

As described above, according to the present invention, in the airbag apparatus for use in the motor vehicle mounted on the motor vehicle, particularly, an airbag-holding member constructed such that a film sheet in which a plurality of resin layers is formed in a layer-stack manner with regard to a sheet cross-sectional direction has a bag shape that wraps around an entire external surface of the airbag in a folded-back condition, is used. The airbag-holding member is disposed to wrap an external surface of the airbag in the folded-back condition housed in an airbag housing portion, in the partitioned area that is partitioned by the airbag housing portion and the airbag cover. Therefore, it becomes possible to assuredly hold the folded-back shape of the airbag that is previously folded back.

Further, the thin thickness portion, in which a thickness with regard to a sheet cross-sectional direction is formed to be thinner than that of the other sheet portion at a predetermined portion which is previously set in each of the portions of the film sheet of the airbag-holding member, is provided. Therefore, the airbag-holding member is ruptured at the thin thickness portion while receiving the developing and expanding force of the airbag at a time of occurrence of a motor vehicle accident. Since developing and expanding operations of the airbag is thereby allowed while releasing a holding condition of the folded-back shape of the airbag, it becomes possible for achieving an appropriate developing capability of the airbag.

DETAILED DESCRIPTION OF THE EMBODIMENTS

Hereinafter, embodiments of the present invention will be explained in detail referring to the drawings. First, a construction of an airbag apparatus 100 of the present embodiment will be explained referring to FIGS. 1 through 4. The airbag apparatus 100 is, although not particularly shown, mounted corresponding to an occupant seated in a driver's seat of a motor vehicle (hereinafter referred to as motor vehicle occupant), and is provided with a construction to be built in a steering wheel for steering the motor vehicle.

Figure 1:
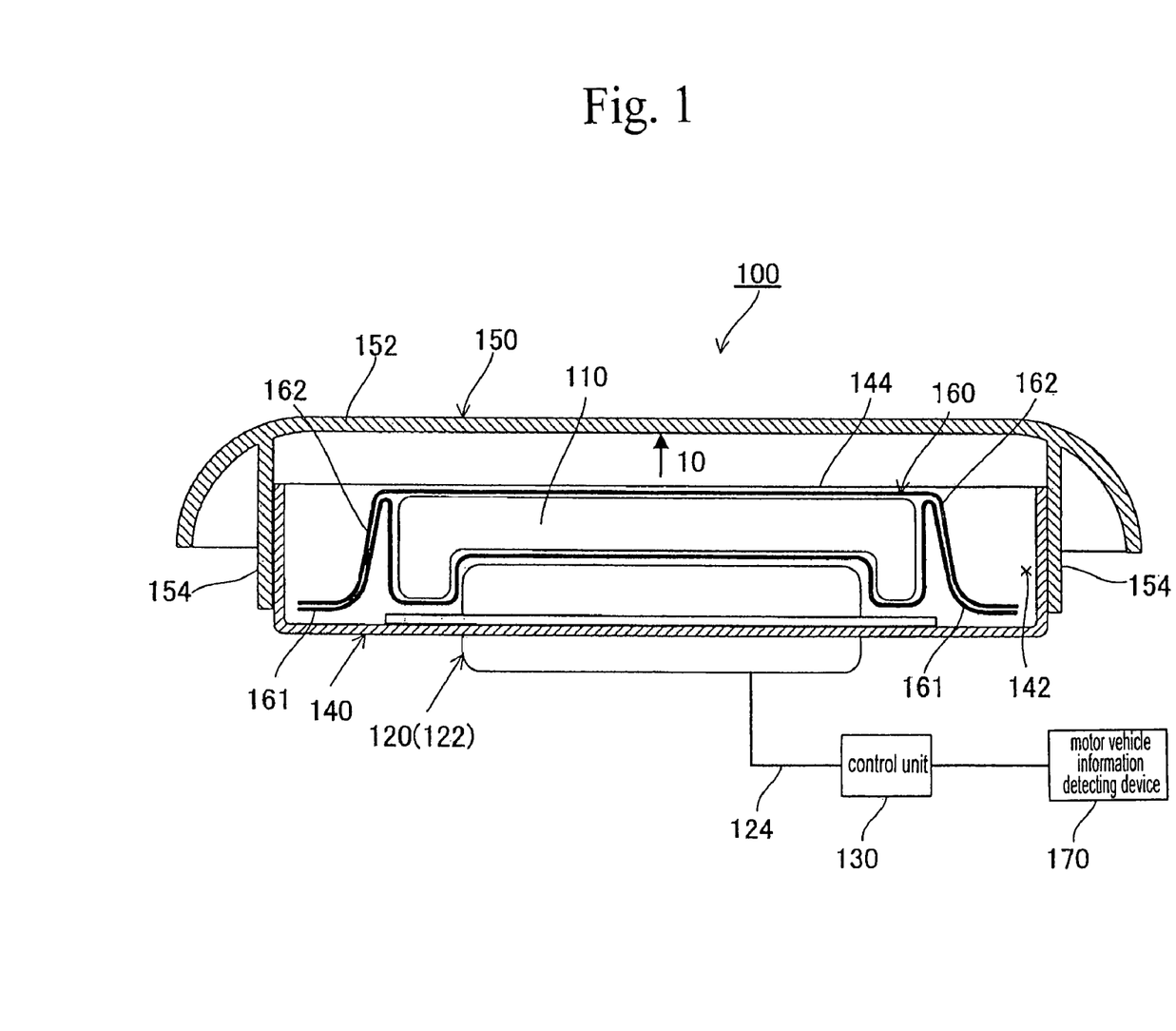
FIG. 1 is a view showing a cross-sectional structure of an airbag apparatus serving as an embodiment of an airbag apparatus of the present invention.

A cross-sectional structure of the airbag apparatus 100 serving as an embodiment of "an airbag apparatus" in the present invention is shown in FIG. 1. The airbag apparatus 100 is at least provided with an airbag 110, an inflator 120, a control unit 130, a retainer 140, an airbag cover 150, and an airbag-holding member 160, as basic components.

The airbag 110 has a bag-shape that is developed and expanded so as to restrain the motor vehicle occupant at a time of a motor vehicle collision, and is formed by stitching a piece or a plurality of pieces of base cloths of the airbag formed from synthetic resin into a bag shape. Further, the airbag apparatus 100 is housed in the retainer 140 in a folded-back condition folded back in a predetermined configuration. As the "predetermined configuration" described above, there may have a roll-folding configuration formed in a manner such that the airbag 110 is retracted to have a roll shape, a bellows folding configuration that is formed in a manner such that the airbag 110 is folded back to have a bellows shape, a folding configuration in which these configurations are combined, or the like. The airbag apparatus 110 described here corresponds to the "airbag" in the present invention.

The inflator 120 includes a gas-generating portion 122 generating gas for developing and expanding the airbag 110, in an internal space of the airbag 110 constructed to have a bag shape. The gas-generating portion 122 is connected to the control unit 130 via a harness 124 and generates the gas for developing and expanding the airbag 110 by means of an output of a control signal from the control unit 130. This gas for developing and expanding the airbag 110 generated in the gas-generating portion 122 is supplied to an internal part of the airbag 110 through a gas-distributing pathway (not shown).

The control unit 130 is composed of a CPU (Central Processing Unit) having a known construction, a ROM, a RAM, an input and output device, a peripheral device (illustration of any of these devices are omitted), and the like. Further, the control unit 130 is connected to a motor vehicle information detecting device 170 serving as a component of a motor vehicle side, and outputs a control signal to the gas generating portion 122 on the basis of information transmitted from the motor vehicle information detecting device 170. Typically, a collision detecting sensor that detects occurrence of the motor vehicle collision on the basis of acceleration or the like applied to the motor vehicle is used, as the motor vehicle information detecting device 170. The inflator 120 described here corresponds to a "gas-supplying portion" in the present invention.

The retainer 140 is constructed as a box-shaped case member having a bottom provided with a function for housing the airbag 110 having the aforementioned construction, and the inflator 120. Namely, in a housing space 142 of the retainer 140 for housing the inflator 120, the inflator 120 is housed at a lower part thereof, and the airbag 110 is housed above the housed inflator 120. At an upper part of the retainer 140, an airbag opening 144 that opens so as to allow developing and expanding operation of the airbag 110 in the housed condition is formed. The airbag 110 protrudes in a direction indicated by an arrow 10 in FIG. 1, while being developed and expanded through the airbag opening 144 at a time of the motor vehicle collision. The retainer 140 is constructed with a molded member formed from a metal material or a resin material. The retainer 140 described here corresponds to the "airbag housing portion" in the present invention, and the airbag opening 144 of the retainer 140 corresponds to the "airbag opening" in the present invention.

The airbag cover 150 is constructed as a resin-material made member that covers the airbag opening 144 of the retainer 140 from above in a housed condition that the airbag 110 is housed in the retainer 140. Accordingly, the motor vehicle occupant side of the airbag 110 is covered by the airbag cover 150. The airbag cover 150 is, actually, provided with a flat plate portion 152 horizontally extending along an opening plane surface of the airbag opening 144, and a standing portion 154 standing along a wall portion of the retainer 140 from the flat plate portion 152. The airbag cover 150 is attached to and fixed to a retainer 140 side at the standing portion 154.

In addition, although not shown, a reduced-thickness portion in which a plate thickness at the flat plate portion 152 and the standing portion 154 is relatively reduced, namely a so-called tear line is provided in the airbag cover 150. The airbag cover 150 is ruptured at the tear line thereof, resulting in allowing the airbag opening 144 to form an open condition at a time of developing and developing operation of the airbag 110 when a motor vehicle accident such as a motor vehicle collision occurs. Further, the airbag cover 150 allows the airbag 110 to protrude outside the retainer 140 through the airbag opening 144. The airbag cover 150 corresponds to the "airbag cover" in the present invention.

Figure 2:
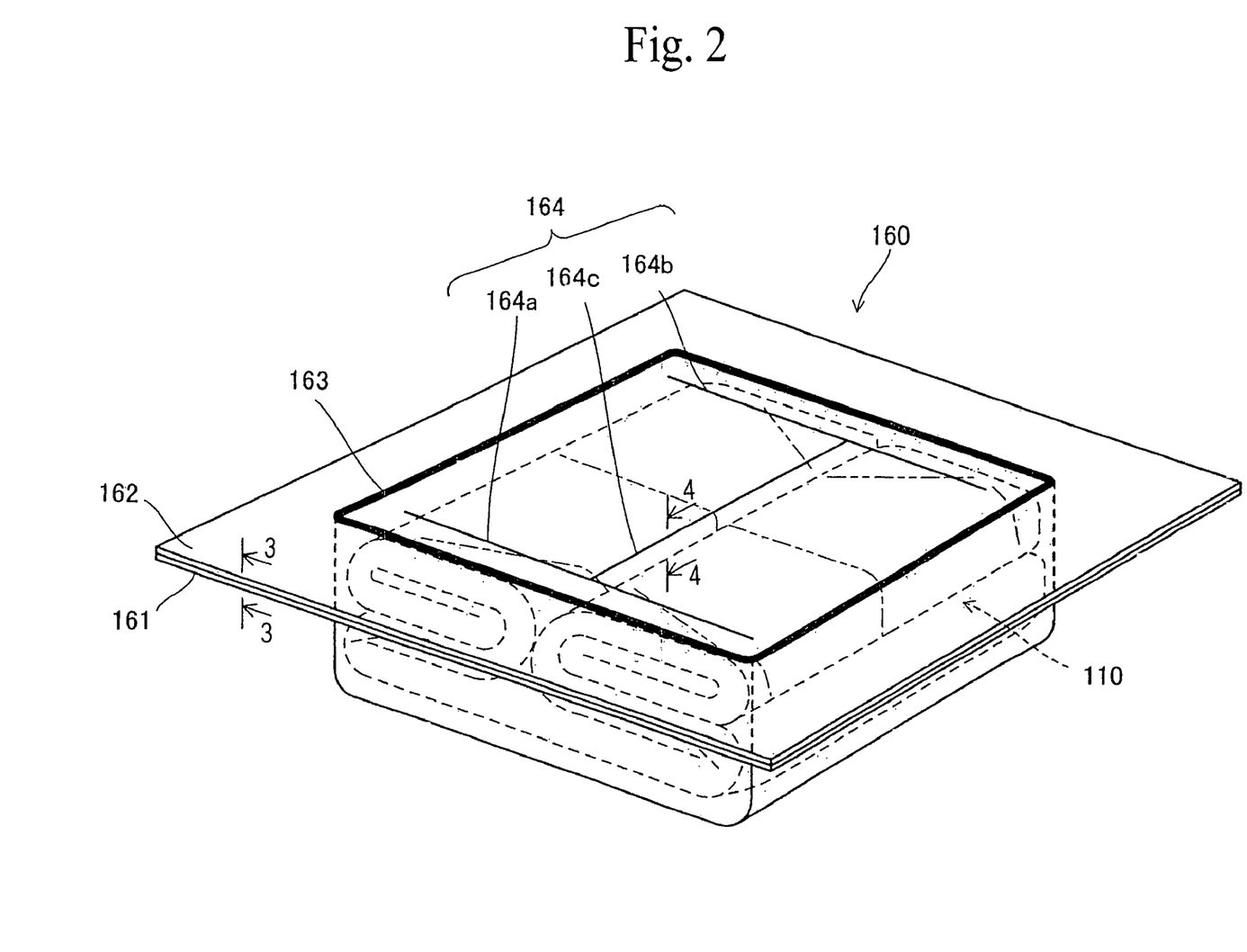
FIG. 2 is a view showing a condition in which an airbag in a folded-back condition in the present embodiment is held by means of an airbag-holding member.
Figure 3:
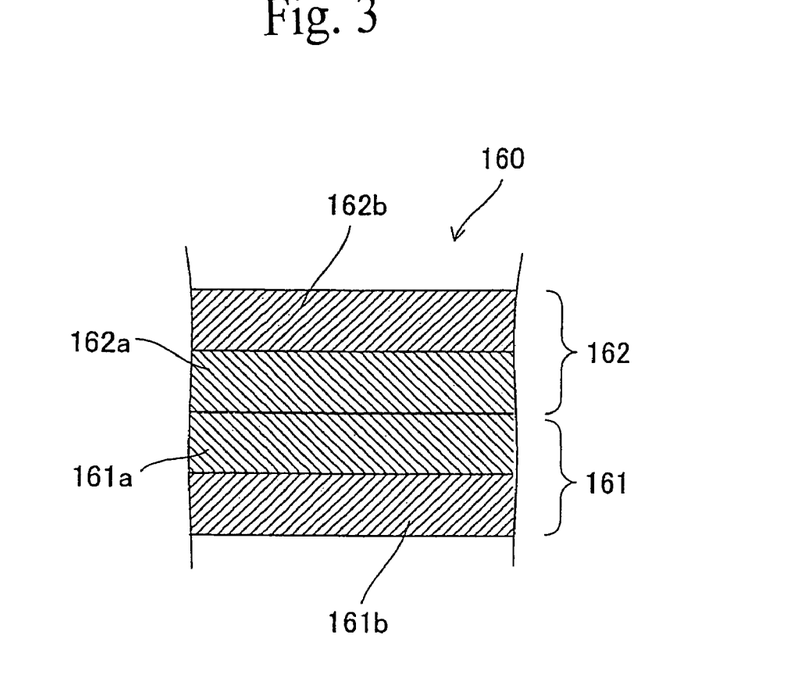
FIG. 3 is a cross-sectional view of the airbag-holding member, taken along line 3-3 in FIG. 2.
Figure 4:
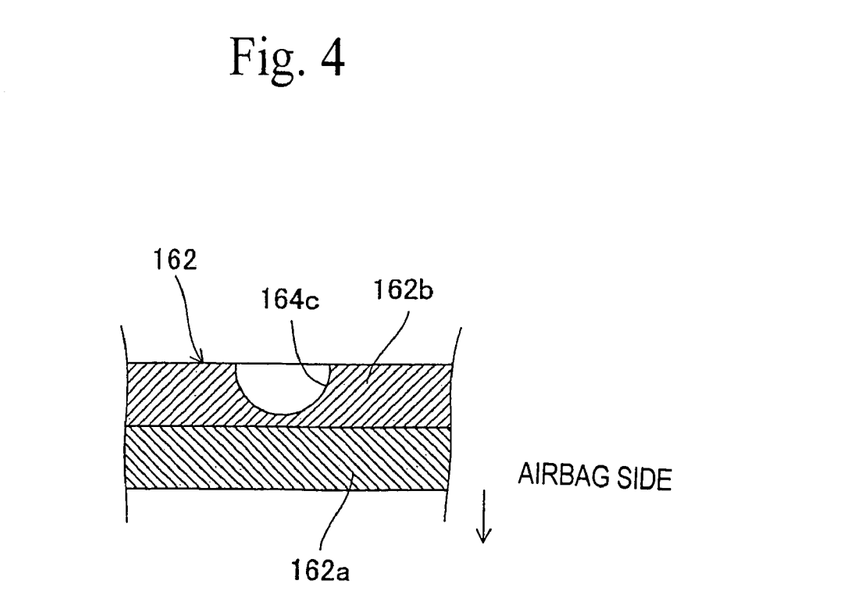
FIG. 4 is a cross-sectional view of the airbag-holding member taken along line 4-4 in FIG. 2.

The airbag-holding member 160 is a member provided with a function to hold (or may sometimes be called as "to maintain") a folded-back shape of the airbag 110 by providing a film sheet having translucency to cover an external surface of the airbag 110 in a folded-back condition folded back in a predetermined configuration. The airbag-holding member 160 described here corresponds to the "airbag-holding member" in the present invention. The airbag-holding member 160 is constructed by joining a lower film sheet 161 and an upper film sheet 162 each other into a bag shape, and thereafter sandwiching the airbag 110 in the folded-back condition between the lower film sheet 161 and the upper film sheet 162. Here, a condition in which the folded-back shape of the airbag 110 in the folded-back condition of the present embodiment is held by means of the airbag-holding member 160 is shown in FIG. 2. Further, a cross-sectional structure taken along line 3-3 of the airbag-holding member 160 in FIG. 2 is shown in FIG. 3, and a cross-sectional structure taken along line 4-4 of the airbag-holding member 160 in FIG. 2 is shown in FIG. 4.

As shown in FIG. 2, each of the two pieces of the lower film sheet 161 and the upper sheet 162 constituting the airbag-holding member 160 in the present embodiment is formed from a sheet-shaped film sheet having translucency. In the airbag-holding member 160, an outer peripheral edge portion of the lower film sheet 161 and an outer peripheral edge portion of the upper film sheet 162 are overlapped on each other and heat-welded (joined) to each other at a heat-welding portion 163. The heat-welded lower film sheet 161 and the upper film sheet 162 are formed into a bag shape.

In the present embodiment, the airbag 110 in the folded-back condition is sandwiched by the lower film sheet 161 and the upper film sheet 162 and thereafter each of the outer peripheral edges of the film sheets are sealed. Therefore, the airbag-holding member 160 is configured into an airbag-packaging condition (sometimes called as "airbag-sealing condition", "airbag tight-sealing condition", or "airbag-packing condition") in which an entire external surface of the airbag 110 in the folded-back condition is wrapped up with the lower film sheet 161 and the upper film sheet 162. In the airbag-packaging condition of the airbag-holding member 160, the folded-back shape of the airbag 110 in a folded-back condition is configured to be assuredly held by the airbag-holding member 160.

Incidentally, with regard to the airbag-packaging condition, it is preferable to construct the airbag 110 to have a reduced volume by compressing the airbag 110 in the folded-back condition via the bag-shaped film sheet from outside. With regard to compressing the airbag 110 in the folded-back condition, it is made by forming an internal part of the film sheet to be in a compressed condition by vacuuming the airbag 110 housed in a film sheet formed in a bag-shaped manner, or by pressurizing the film sheet itself from outside. In accordance with such a condition describe above, the size occupied by the airbag 110 in the folded-back condition, which is held by means of the airbag-holding member 160 can be suppressed and an entire airbag apparatus 100 becomes a compact size.

As shown in FIG. 3, in the airbag-holding member 160 in the present embodiment, each of the lower film sheet 161 and the upper film sheet 162 is configured to be a film sheet having a two-layer structure in which the first resin layer and the second resin layer are disposed in a layer-stack manner with regard to a film cross-sectional direction or a sheet cross-sectional direction. Further, in the airbag-holding member 160, the lower film sheet 161 and the upper film sheet 162 are disposed in a manner such that the first resin layer 161a at a side of the lower film sheet 161 and the first resin layer 162a at a side of the upper film sheet 162 face each other.

The first resin layers, 161a and 162a, are constructed as resin layers at the side of the airbag where the airbag 110 directly contacts therewith, and are constructed to have translucency in the formed condition. In addition, the first resin layers, 161a and 162a, are also constructed to be resin layers having a characteristic of heat-welding (hereinafter referred to as a heat-welding characteristic). On the other hand, the second resin layers, 161b and 162b, are resin layers provided outside the first resin layers, 161a and 162a, which do not directly contact the airbag 110, and are constructed as a resin layer having the translucency in the formed condition and having high strength. Incidentally, the film sheet as the airbag-holding member 160 in the present embodiment may be a single film sheet having an integrally formed shape including a portion of the first resin layer 161a and a portion of the second resin layer 161b, or may be a film sheet having a construction in which a film sheet formed from the first resin layer 162a and a film sheet formed from the second resin layer 162b are overlapped on each other in the layer-stack manner.

Further, the present embodiment is constructed such that a portion where the thin thickness portion (some times also called as "weak portion" or "reduced-thickness portion") with regard to a cross-sectional direction is formed continuously or intermittently, namely a so-called tear line 164 is provided at an upper surface of the upper film sheet 162 positioned above the airbag 110 in a condition being housed in the retainer 140, as shown in FIG. 2. The tear line 164 corresponds to the "thin thickness portion" in the present invention. The tear line 164 is constructed with a first tear portion 164a and a second tear portion 164b extending at both end sides of a plane surface of the airbag-holding member 160, and a third tear portion 164c extending between the first tear portion 164a and the second tear portion 164b. A shape of the tear line, when the airbag-holding member 160 is looked from above, is formed into approximately H-shape. The shape of the tear line having approximately H-shape sometimes is called as H-open type.

As shown in FIG. 4, any of the third tear portion 164c and other tear portions that constitute the tear line 164, typically, are formed in the second resin layer 162b, in the first resin layer 162a and the second resin layer 162b, of the upper film sheet 162. Although a cross-sectional shape of the tear line 164c in FIG. 4 is formed into a half circular arc or a curved line, with regard to a cross-sectional shape of the tear line, various shapes, such as a square shape, V-shape, or the like, other than the half circular arc or the curved line can be adopted.

As for a forming method of the tear line 164, there may be a method in which a film is weakened by performing a laser processing to the second resin layer 162b, a method in which the second resin layer 162b is weakened by heating the same with ironing, a method in which a thickness of the upper film sheet 162 itself is partially reduced, a method in which a perforation processing, a slit processing, an embossing, or the like is performed to the upper film sheet 162, or the like. In this case, a depth of the reduced thickness with regard to a film cross-sectional direction of the tear line 164 can appropriately be set within a limit of a wall thickness of the second resin layer 162b. It is preferable that, for example, the depth of the reduced thickness with regard to the film cross-sectional direction of the tear line 164 is set such that the strength at the tear line 164, namely the force required for rupturing at the tear line 164 is configured to be smaller than the airbag holding force (substantially, the welding strength at the heat-welding portion 163) of the airbag-holding member 160 for holding the airbag 110 in the folded-back condition.

Incidentally, a position of the tear line 164 in the airbag-holding member 160, it is preferable to be constructed such that the tear line 164 is positioned at an airbag opening 144 side of the airbag-holding member 160, when the airbag-holding member 160 housing the airbag 110 in the folded-back condition is housed in the retainer 140. In accordance with such a construction, since the airbag-holding member 160 is ruptured at a proximity position close to the airbag opening 144, and the airbag 110 is to be protruded outside of the retainer 140 through the airbag opening 144 from the proximity position, it becomes possible to suppress an operation of the airbag 110 to be limited. Therefore, the developing capability of the airbag 110 becomes smooth.

Further, as for the tear line 164 in the airbag-holding member 160, it is preferable to use a construction in which the tear line 164 is colored with a predetermined color. With regard to the "coloring for the tear line 164" described here, the coloring operation for the tear line 164 may be performed by painting the tear line 164 itself or the coloring operation for the tear line 164 may be performed by coloring the tear line 164 by causing a colored tape or a sticker to adhere to the tear line 164. Typically, it is preferable to use a warm color or a highly visible color so that the position, the direction (extending direction), or the like, of the tear line 164 is easily recognized by a worker. In accordance with such a construction, in an assembling work for housing the airbag-holding member 160 that is holding the airbag 110 in the folded-back condition into the retainer 140, the worker can easily recognize the position or the like of the tear line 164 and occurrence of an erroneous assembling work is prevented.

Figure 5:
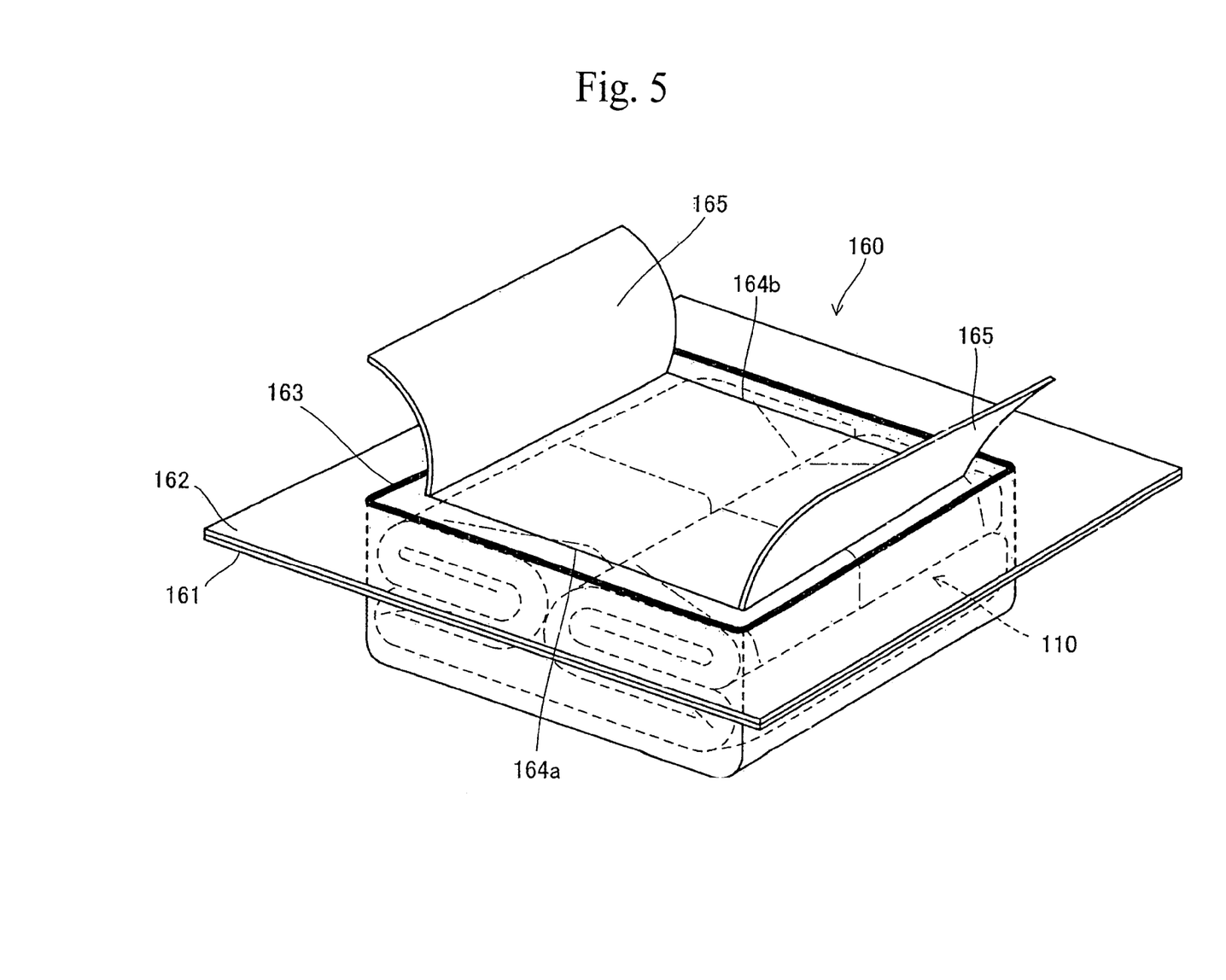
FIG. 5 is a view showing a condition in which the airbag-holding member in FIG. 2 is ruptured along a tear line.

The airbag-holding member 160 having the aforementioned construction is ruptured along the tear line 164 because the developing and expanding force is exerted to an internal peripheral surface of the airbag-holding member 160, when the airbag 110 is developed and expanded at a time of occurrence of a motor vehicle accident. At this moment, a condition in which the airbag-holding member 160 in FIG. 2 is ruptured along the tear line 164 is shown in FIG. 5. As shown in FIG. 5, the airbag-holding member 160 releases the holding condition of the folded-back shape of the airbag 110 by that a pair of rupture pieces, 165 and 165, which is ruptured at the tear line 164 of the upper film sheet 162 is developed outside in a gate fold manner. The airbag-holding member 160 allows the developing and expanding operations and protruding-out operation of the airbag 110 directed toward an airbag cover 150 side.

According to the airbag apparatus 100 having the aforementioned construction, the folded-back shape of the airbag 110 in the folded-back condition is prevented from being deformed, and it becomes possible for the folded-back shape to assuredly be held by using the airbag-holding member 160 formed from the film sheet configured to have a bag shape for wrapping around the entire external surface of the airbag 110 in the folded-back condition. By this construction, it becomes possible for the quality with regard to holding the folded-back shape of the airbag 110 stably. Further, since the present embodiment has a construction in which the entire external surface of the airbag 110 is wrapped with the film sheet, there is no possibility such that the folded-back configuration of the airbag 110 is limited by being influenced by the structure of the airbag-holding member 160 side. Furthermore, by sealing the airbag 110 in the folded-back condition with the bag-shaped film sheet, deterioration of the airbag 110 can be suppressed.

Furthermore, in the present invention, since the tear line 164 that serves as the thin thickness portion is provided at a previously determined position of the airbag-holding member 160, and the airbag-holding member 160 is constructed to be ruptured at the tear line 164, it becomes possible to suppress the airbag-holding member 160 to affect bad influence to the developing capability of the airbag 110 by being ruptured at an unspecified portion, and therefore, it becomes possible to achieve the appropriate developing capability of the airbag 110.

Moreover, in the present embodiment, since the airbag-holding member 160 is formed from the translucent film sheet, the airbag-holding member 160 is provided with a function in which the folded-back condition of the airbag 110 can be visibly confirmed at a time when and after the airbag-holding member 160 is mounted, in addition to the original function for holding the folded-back shape of the airbag 110 in the folded-back condition. As for the translucency of the film sheet, it is sufficient that the translucent film sheet enables visible confirmation through the film sheet regardless of the small or large of a degree of translucency. As the film sheet, a transparent film sheet and a half transparent film sheet (translucent white film sheet or colored film sheet) can appropriately be used. According to such a construction of the airbag apparatus 100 described above, since it is possible to visibly confirm whether the folded-back shape of the airbag 110 in the folded-back condition is maintained (kept) without being deformed, through the airbag-holding member 160 as needed, it becomes possible for the quality with regard to the holding condition for the folded-back shape of the airbag 110 stably.

Further, in the airbag apparatus 100 having the aforementioned construction, when the airbag 110 is developed and expanded at the time of the motor vehicle accident, the developing and expanding force is exerted to an internal peripheral surface of the airbag-holding member 160. In this case, the strength of the tear line 164 of the airbag-holding member 160 is configured to be smaller than the holding force of the film sheet for holding the airbag 110 in the folded-back condition, and therefore, the airbag-holding member 160 is ruptured along the tear line 164 and releases the holding condition for the folded-back shape of the airbag 110. In addition, the airbag-holding member 160 allows a developing and expanding operation and a protruding out operation of the airbag 110 directed to the airbag cover 150 side.

According to such a construction, during the time until the airbag-holding member 160 is ruptured along the tear line 164, it becomes possible to assuredly hold the folded-back shape of the airbag 110 in the folded-back condition. Furthermore, in the airbag-holding member 160 in the present embodiment, the second resin layer 161*b* and the second resin layer 162*b* each having high strength are disposed at an outside thereof, and therefore, it becomes possible to secure film strength of the airbag-holding member 160 itself. Consequently, it is effective for further assuredly holding the folded-back shape of the airbag 110 in the folded-back condition after the airbag-holding member 160 is mounted as well.

As described above, in the present embodiment, a further function with regard to the strength can be applied to the first resin layers, 161*a* and 162*a*, and the second resin layers, 161*b* and 162*b*, of the film sheet constituting the airbag-holding member 160 in addition to the translucency, resulting in forming a rational configuration.

Further, the airbag 110 causes the airbag cover 150 to be ruptured along the tear line 164 at a time of developing and developing operations thereof, and protrudes outside the retainer 140 through the airbag opening 144. Thus, the airbag 110 developed and expanded in a predetermined occupant restraining area is configured to restrain the motor vehicle occupant.

Incidentally, with regard to the shape of the tear line in the airbag-holding member 160 shown in FIG. 2, a shape other than the approximately H-shape shown in FIG. 2 can be adopted. For example, the shape of the tear line capable of suppressing the developing and expanding operations of the airbag 110 to be limited can be selected from various selections. With regard to the tear line shape in the airbag-holding member 160 in the present embodiment, another condition is shown in FIG. 6, and a condition in which the airbag-holding member 160 in FIG. 6 is ruptured along a tear line 166 is shown in FIG. 7.

Figure 6:
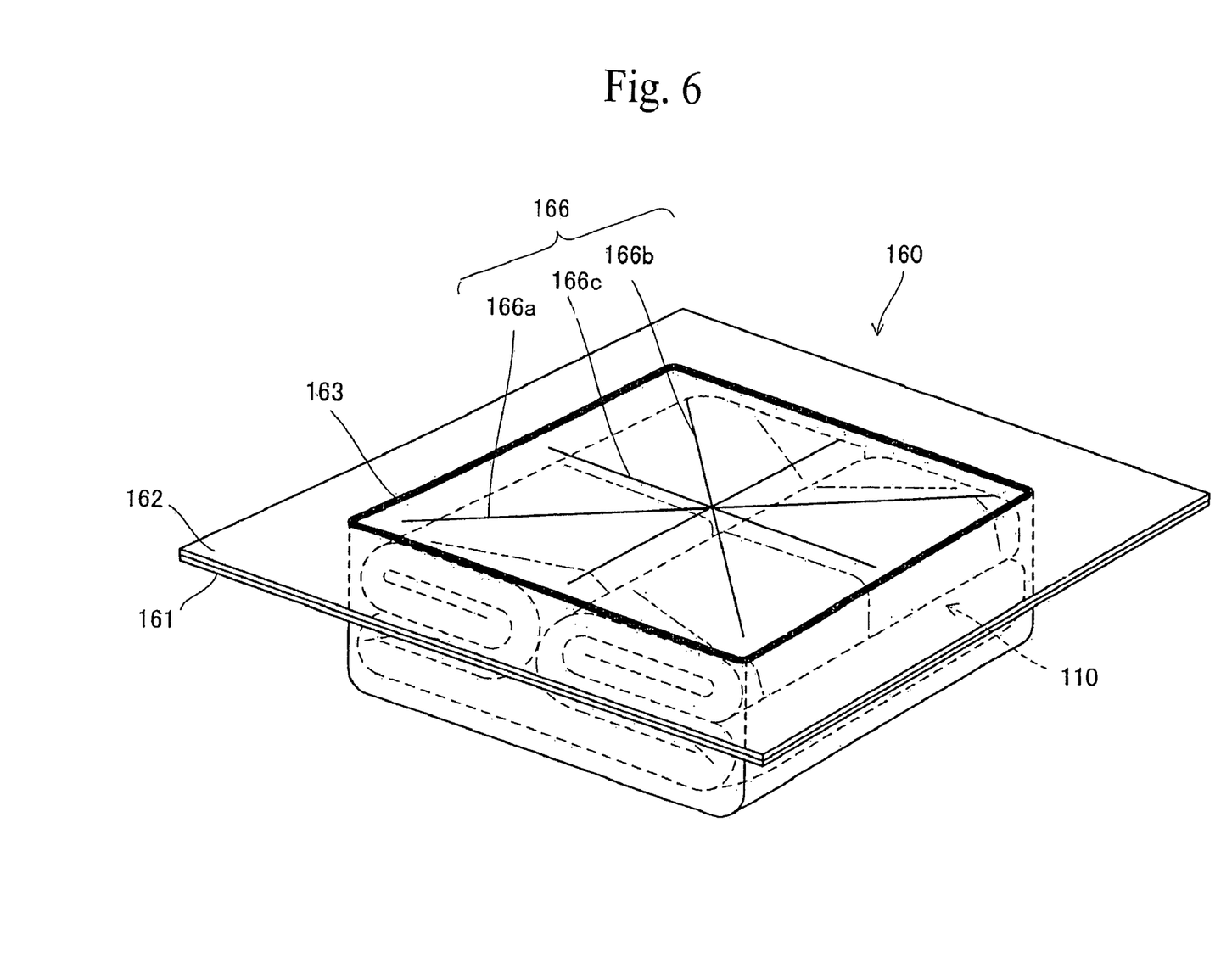
FIG. 6 is a view showing another configuration of the tear line in the airbag-holding member according to the present embodiment.

The tear line 166 shown in FIG. 6 is a thin thickness portion corresponding to the "thin thickness portion" in the present invention, and is constructed with a first tear portion 166*a*, a second tear portion 166*b*, and a third tear portion 166*c* each extending on a plane surface of the airbag-holding member 160. The first tear portion 166*a*, the second tear portion 166*b*, and the third tear portion 166*c* are formed to be intersecting with each other at approximately center area of the airbag opening 144, and this is sometimes called as cross-type.

Figure 7:
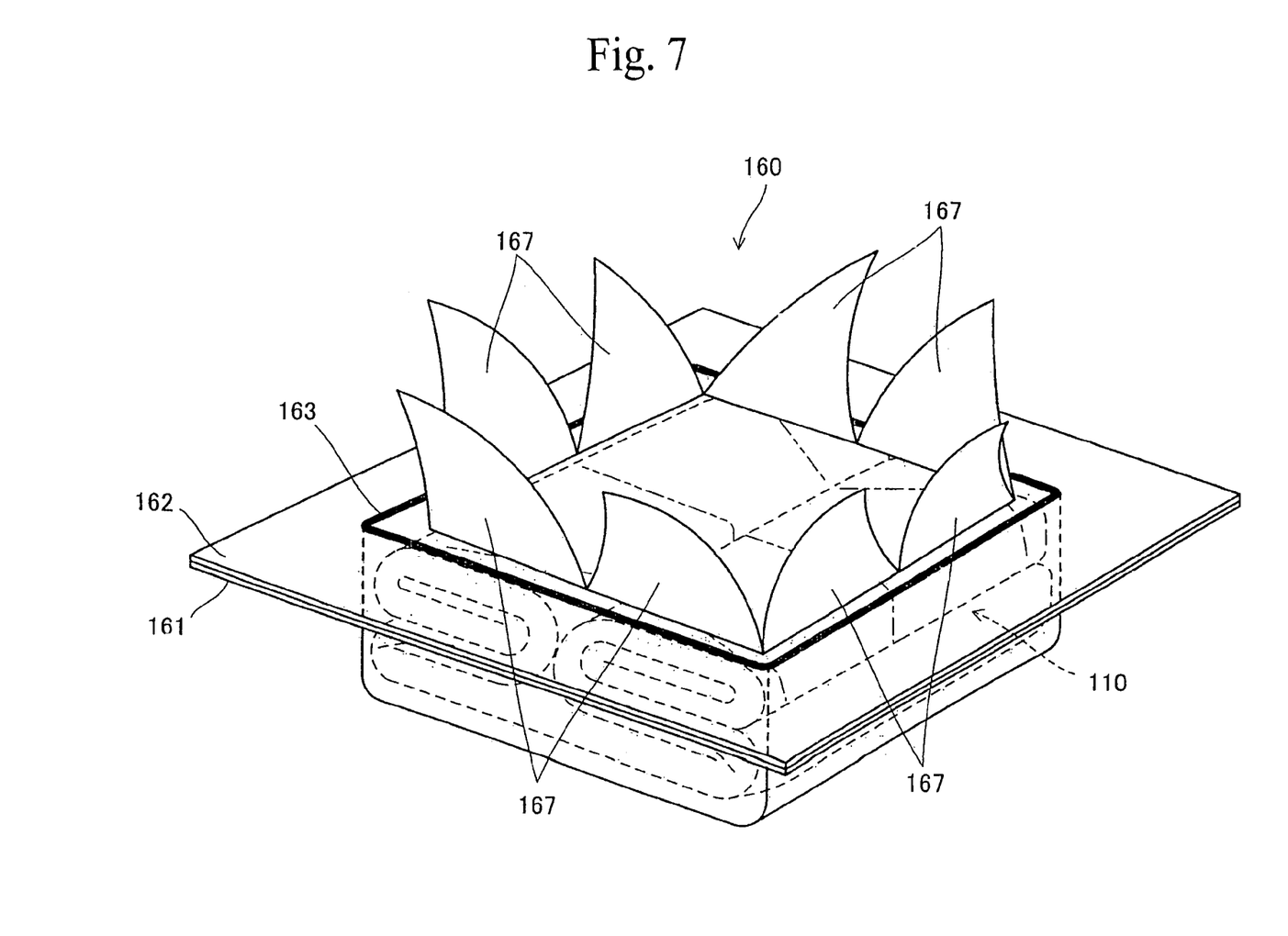
FIG. 7 is a view showing a condition in which the airbag-holding member in FIG. 6 is ruptured along the tear line.

As shown in FIG. 7, the airbag-holding member 160 releases the holding condition of the folded-back condition of the airbag 110 by that a total of eight pieces of rupture pieces 167 ruptured at the tear line 166 of the upper film sheet 162 are outwardly developed, and allows the developing and expanding operations and protruding out operation of the airbag 110 directed to the airbag cover 150 side. According to the present construction, the number of the rupture pieces is particularly increased, and therefore, the developing and expanding operations of the airbag 110 are hard to be limited by the rupture pieces.

Another Embodiment

Incidentally, the present invention is not limited to only the aforementioned embodiment, and various applications and modifications are considerable. For example, each of the following embodiments in which the aforementioned embodiment is applied can also be performed.

In the aforementioned embodiment, the airbag-holding member 160 is constructed by using the film sheet having two-layer structure where the first resin layer and the second resin layer are disposed in a layer-stack manner. However, in the present invention, the airbag-holding member may be constructed by using a film sheet having a multilayer structure in which another resin layer is disposed in a layer-stack manner in addition to this film sheet having the two-layer structure. In this case, as a resin layer to be added, a resin layer having a translucency and an environmental deterioration resistance can be used. The resin layer having the environmental deterioration resistance described here is defined as a resin layer that is good at anti-weatherability such as, heat resistance, moisture resistance, light stability, and so forth. Such a resin layer having environmental deterioration resistance described above is particularly effective in the airbag apparatus installed at a place easily exposed to the open air environment as a motor vehicle.

Further, in the aforementioned embodiment, it is explained that each of outer peripheral edge portions of the film sheets is sealed by heat-welding for the same upon sandwiching the airbag 110 in the folded-back condition by means of the lower film sheet 161 and the upper film sheet 162. However, in the present invention, in replacement of the construction described above, it is possible to use a construction in which an airbag in a folded-back condition is put into an opening bag-shaped film sheet member that is previously prepared, through the opening thereof, and thereafter an opening portion is bound up and sealed with a clamp.

Furthermore, in the aforementioned embodiment, an airbag apparatus mounted corresponding to the motor vehicle occupant seated in the driver's seat of the automobile is described. However, the present invention can also be applied to a construction of an airbag apparatus mounted corresponding to a motor vehicle occupant seated in a seat other than that of the driver's seat, for example, the motor vehicle occupant seated in a passenger seat, in a rear seat, or further, a pedestrian outside the motor vehicle. With regard to an airbag apparatus for restraining the pedestrian outside the motor vehicle, the airbag apparatus can typically be mounted on a bonnet portion, a cowl portion, an A-pillar portion, or the like of a motor vehicle.

Moreover, in the aforementioned embodiment, the airbag apparatus to be mounted on the automobile motor vehicle is described. However, the present invention can also be applied to a construction of an airbag apparatus in other automobile, for example, a truck, a bus, an electric train, boats and ships, a motor cycle, or the like.

The disclosure of Japanese Patent Application No. 2005-368742 filed on Dec. 21, 2005 is incorporated herein as a reference.

While the invention has been explained with reference to the specific embodiments of the invention, the explanation is illustrative and the invention is limited only by the appended claims.

What is claimed is:

1. An airbag apparatus mounted on a vehicle comprising:
an airbag;
an airbag housing portion for housing the airbag in a folded-back condition folded back in a predetermined configuration, and including an airbag opening for allowing the airbag to be developed and expanded therefrom;
an airbag cover for covering the airbag opening;
a gas-supplying portion for supplying gas to the airbag for developing and expanding the airbag in a developing and expanding area when a motor vehicle accident occurs;
an airbag-holding member formed of a film sheet comprising a plurality of resin layers stacked together, said airbag-holding member having a bag-shape and directly wrapping all around entire external surfaces of the airbag in the folded-back condition; and
a thin thickness portion formed at a predetermined portion of the film sheet, and having a thickness less than the other portion of the film sheet,
wherein the airbag-holding member is constructed to hold a folded-back shape of the airbag while wrapping around the entire external surfaces of the airbag in the folded-back condition housed in the airbag housing portion in a partitioned area between the airbag housing portion and the airbag cover, and to be ruptured at the thin thickness portion by receiving developing and expanding force of the airbag from the gas supplied from the gas supplying portion when a vehicle accident occurs, while releasing the hold of the folded-back shape of the airbag,
the airbag holding member comprises a lower film sheet and an upper film sheet between which the airbag folded in a predetermined shape is completely held, and
each of the upper and lower film sheets comprises a first resin layer having a heat-welding characteristic, and a second resin layer having high strength, said upper and lower film sheets being arranged such that the first resin layers face inwardly to contact each other outside the folded airbag.

2. The airbag apparatus according to claim 1, wherein the airbag-holding member is configured such that force required when the airbag-holding member is ruptured at the thin thickness portion is smaller than force for holding the folded-back shape of the airbag in the folded-back condition.

3. The airbag apparatus according to claim 1, wherein the thin thickness portion is positioned at an airbag opening side of the airbag-holding member when the airbag in the folded-back condition is housed in the airbag housing portion.

4. The airbag apparatus according to claim 3, wherein the thin thickness portion positioned at the airbag opening side of the airbag-holding member is provided with a predetermined color.

5. The airbag apparatus according to claim 1, wherein the film sheet includes at least one of a resin layer having translucency, a resin layer having high strength, and a resin layer having an environmental deterioration resistance.

6. The airbag apparatus according to claim 1, wherein the airbag has a reduced volume in the folded-back condition by compression thereof.

7. The airbag apparatus according to claim 1, wherein the airbag holding member has a center portion for receiving the folded airbag, and an edge portion surrounding the center portion, said center portion being separated and sealed from the edge portion.

8. The airbag apparatus according to claim 1, wherein the upper and lower film sheets are welded together at four side portions in a rectangular shape at the first resin layers.

9. The airbag apparatus according to claim 8, wherein only the second layer of the upper film sheet has the thin thickness portion.

10. The airbag apparatus according to claim 1, wherein the airbag-holding member is arranged around the airbag such that the airbag-holding member holds the folded-back shape of the airbag in a reduced air pressure condition.

11. An airbag apparatus mounted on a vehicle, comprising:
an airbag;
an airbag housing portion for housing the airbag in a folded-back condition folded back in a predetermined configuration, and including an airbag opening for allowing the airbag to be developed and expanded therefrom;
an airbag cover for covering the airbag opening;
a gas-supplying portion for supplying gas to the airbag for developing and expanding the airbag in a developing and expanding area when a motor vehicle accident occurs;
an airbag-holding member formed of a film sheet comprising a plurality of resin layers stacked together, said airbag-holding member having a bag-shape and directly wrapping all around entire external surfaces of the airbag in the folded-back condition; and
a thin thickness portion formed at a predetermined portion of the film sheet, and having a thickness less than the other portion of the film sheet,
wherein the airbag-holding member is constructed to hold a folded-back shape of the airbag while wrapping around the entire external surfaces of the airbag in the folded-back condition housed in the airbag housing portion in a partitioned area between the airbag housing portion and the airbag cover, and to be ruptured at the thin thickness portion by receiving developing and expanding force of the airbag from the gas supplied from the gas supplying portion when a vehicle accident occurs, while releasing the hold of the folded-back shape of the airbag, and
the gas-supplying portion is an inflator disposed outside the airbag and the airbag-holding member, gas from the inflator being supplied to the airbag.

* * * * *